(12) United States Patent
Mao et al.

(10) Patent No.: US 10,138,994 B2
(45) Date of Patent: Nov. 27, 2018

(54) GEARBOX OF GEAR MOTOR ASSEMBLY

(71) Applicant: JOHNSON ELECTRIC S.A., Murten (CH)

(72) Inventors: Wei Xing Mao, Shenzhen (CN); Fan Ouyang, Shenzhen (CN); Xiao Liang Yue, Shenzhen (CN); Long Yan, Shenzhen (CN); Chuan Liu, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 338 days.

(21) Appl. No.: 14/970,064

(22) Filed: Dec. 15, 2015

(65) Prior Publication Data
US 2016/0169368 A1 Jun. 16, 2016

(30) Foreign Application Priority Data
Dec. 16, 2014 (CN) .......................... 2014 1 0782759

(51) Int. Cl.
*F16H 57/039* (2012.01)
*F16H 1/16* (2006.01)
*F16H 57/03* (2012.01)
*F16H 57/031* (2012.01)
*F16H 57/04* (2010.01)
*F16H 55/24* (2006.01)

(52) U.S. Cl.
CPC ............. *F16H 57/039* (2013.01); *F16H 1/16* (2013.01); *F16H 57/03* (2013.01); *F16H 57/031* (2013.01); *F16H 57/0424* (2013.01); *F16H 57/0498* (2013.01); *F16H 55/24* (2013.01)

(58) Field of Classification Search
CPC ........................... F16H 57/039; F16H 57/031
See application file for complete search history.

(56) References Cited

U.S. PATENT DOCUMENTS

| 1,762,790 | A | * | 6/1930 | Odenbach | F16H 1/16 184/13.1 |
| 5,566,592 | A | * | 10/1996 | Adam | F16H 1/16 464/89 |
| 2001/0026105 | A1 | * | 10/2001 | Torii | F16H 57/029 310/75 |
| 2002/0011127 | A1 | * | 1/2002 | Torii | F16D 3/68 74/425 |

(Continued)

FOREIGN PATENT DOCUMENTS

WO WO-2012026430 A1 * 3/2012 ............... F16H 1/16

*Primary Examiner* — Terence Boes
(74) *Attorney, Agent, or Firm* — Muncy, Geissler, Olds & Lowe, PC

(57) ABSTRACT

A gearbox for a gear motor assembly has a housing defining a chamber and an opening in communication with the chamber. A stationary shaft has one end mounted to a bottom of the chamber and the other end extends toward the opening. A worm wheel is rotatably mounted on the stationary shaft and disposed in the chamber. An output gear connected to the worm wheel protrudes out of the chamber. A cover seals the opening of the chamber. The cover has an annular cover plate with an inner bore and an inner flange extending from an edge of the inner bore towards the bottom of the chamber. The worm wheel has a cylindrical boss that is supported by the inner flange against lateral movement.

18 Claims, 4 Drawing Sheets

(56) References Cited

U.S. PATENT DOCUMENTS

2009/0071280 A1* 3/2009 Nakagawa ............ F16H 57/021
  74/425
2011/0265594 A1* 11/2011 Ramirez, Jr. ......... F16H 57/039
  74/416
2017/0089118 A1* 3/2017 Li ........................ E05F 15/697

* cited by examiner

GEARBOX OF GEAR MOTOR ASSEMBLY

CROSS REFERENCE TO RELATED APPLICATIONS

This non-provisional patent application claims priority under 35 U.S.C. § 119(a) from Patent Application No. 201410782759.X, filed in The People's Republic of China on Dec. 16, 2014, the entire contents of which are hereby incorporated by reference.

FIELD OF THE INVENTION

This invention relates to gear motors and in particular, to a gearbox for a gear motor assembly.

BACKGROUND OF THE INVENTION

A common gear motor assembly includes an electric motor and a gearbox. A worm is fixed to or formed on an output shaft of the motor. A worm wheel is mounted in the gearbox on a stationary shaft and arranged to be driven by the worm. The gearbox further includes an output gear. The output gear coaxially connects with the worm wheel and rotates with the worm wheel to thereby drive an external device. A housing of the gearbox includes a chamber for mounting of the worm wheel and an opening in communication with the chamber allowing the output gear to extend there through. A cover is used to seal the opening. A conventional cover includes an outer annular portion made from plastic and an inner annular portion made from rubber. The outer annular portion is mounted to the gearbox housing, and the inner annular portion provides a seal between an outer cylindrical surface of a boss of the worm wheel and an inner bore of the cover. One disadvantage of this conventional cover is that, lateral deviation of the output gear can easily occur under the influence of an external force, especially a radial force, which may lead to flexural deflection of the stationary shaft to which the worm wheel is mounted and hence the generation of vibrations and noises.

SUMMARY OF THE INVENTION

Hence there is a desire for an improved gearbox for a gear motor assembly.

Accordingly, in one aspect thereof, the present invention provides a gearbox comprising: a housing defining a chamber and an opening in communication with the chamber; a stationary shaft having one end mounted to a bottom of the chamber and the other end extending towards the opening; a worm wheel rotatably mounted to the stationary shaft, and disposed in the chamber; an output gear coaxially connected to the worm wheel for rotation with the worm wheel, the output gear protruding out of the opening; a cover mounted to the opening; wherein the cover is formed from a single type of material and includes an annular cover plate having an inner bore and an inner flange extending from an edge of the inner bore towards the bottom of the chamber; and the worm wheel includes a cylindrical boss on a side adjacent the output gear, the boss extends into the inner bore of the annular cover plate and is supported by the inner flange.

Preferably, the cover further includes an outer flange extending from an outer edge of the cover plate towards the bottom of the chamber.

Preferably, a height of the inner flange is greater than a height of the outer flange.

Preferably, the outer flange defines at least one cutout, and the housing includes at least one corresponding protrusion engaging with the cutout for positioning of the cover.

Preferably, the cover further includes a plurality of reinforcement ribs interconnecting a radially outer surface of the inner flange and the cover plate.

Preferably, the reinforcement ribs are each plate-shaped, and a height of the reinforcement ribs gradually decrease in a direction away from the inner flange.

Preferably, a first O-ring is disposed between a distal end of the inner flange and the worm wheel and radially surrounds the stationary shaft.

Preferably, a radially inner surface of the inner flange is provided with a plurality of grooves for receiving lubricant.

Preferably, the output gear is inserted into the cylindrical boss, and a second O-ring is disposed between the output gear and the worm wheel and seals the worm wheel to the stationary shaft.

Alternatively, the output gear is formed from metal, the worm wheel is formed with the output gear by an insert molding process, and the cover is formed from a plastic material.

Preferably, the cover seals the opening in the housing.

A second aspect of the invention provides a gear motor assembly. The assembly comprises a motor, a worm provided on an output shaft of the motor, and a gearbox according to the first aspect of the invention. The worm extends into the gearbox and is in mesh with the worm wheel.

Implementation of the present invention can simplify the structure of the cover and reduce the risk of lateral deviation of the output gear and worm wheel and the flexural deflection of the gearbox stationary shaft, thus reducing vibrations and noise.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
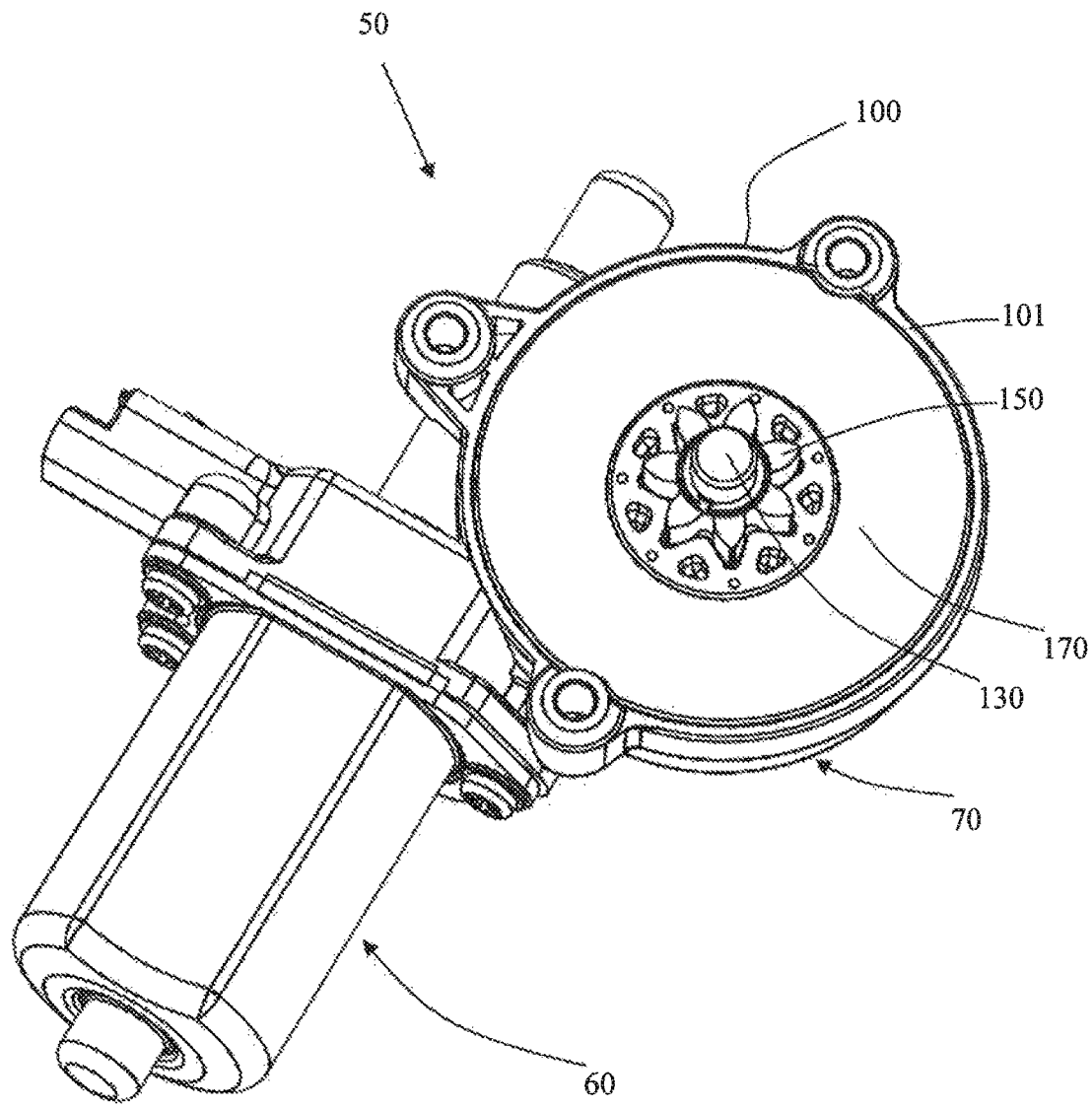
FIG. 1 illustrates a gearbox according to the present invention, mounted to an electric motor.

Referring to the figures, a gear motor assembly 50 in accordance with one embodiment of the present invention includes an electric motor 60 and a gearbox 70 mounted to the motor 60. The gearbox 70 includes a housing 100 having a chamber 105 with an opening 101, a stationary shaft 130 fixed to the housing 100 and extending out of the opening 101, an output gear 150 rotatably mounted to the stationary shaft 130 and extending out of the opening 101, and a cover 170 mounted to the opening 101. The cover preferably seals the opening 101.

Figure 2:
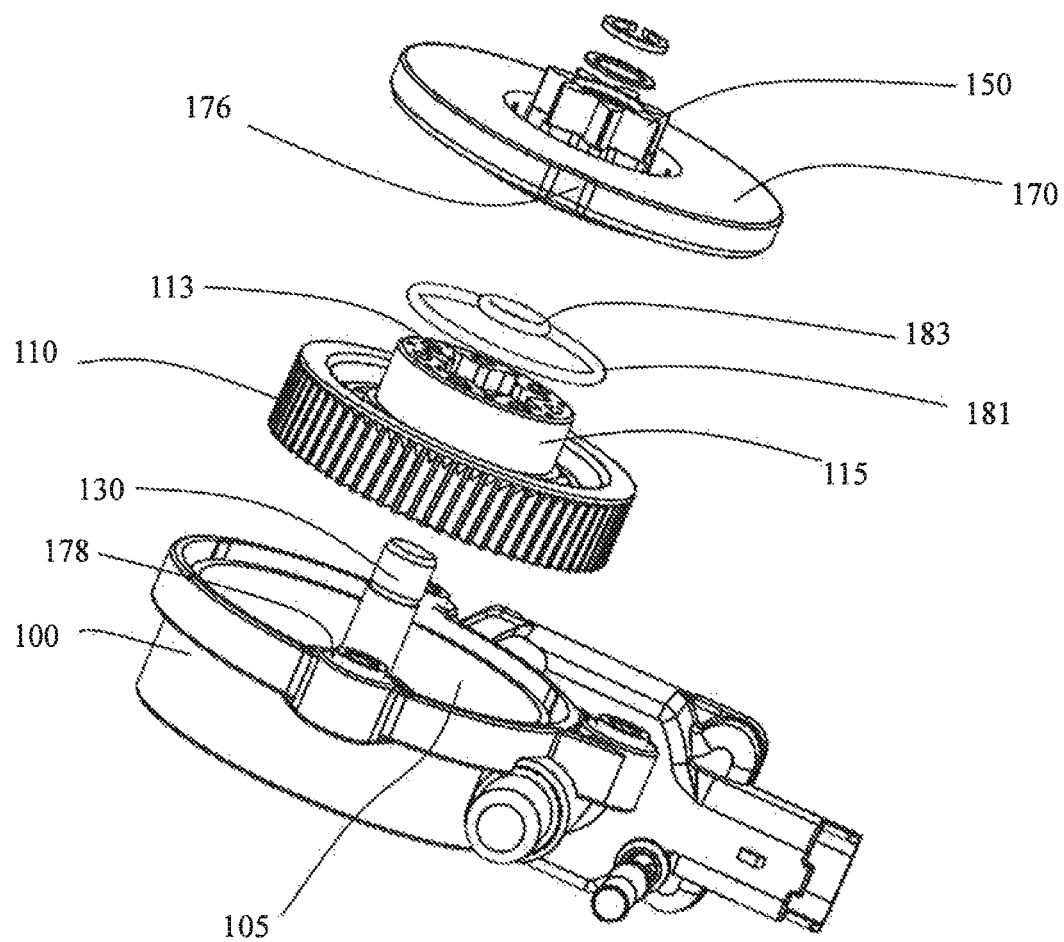
FIG. 2 is an exploded view of the gearbox of FIG. 1.
Figure 3:
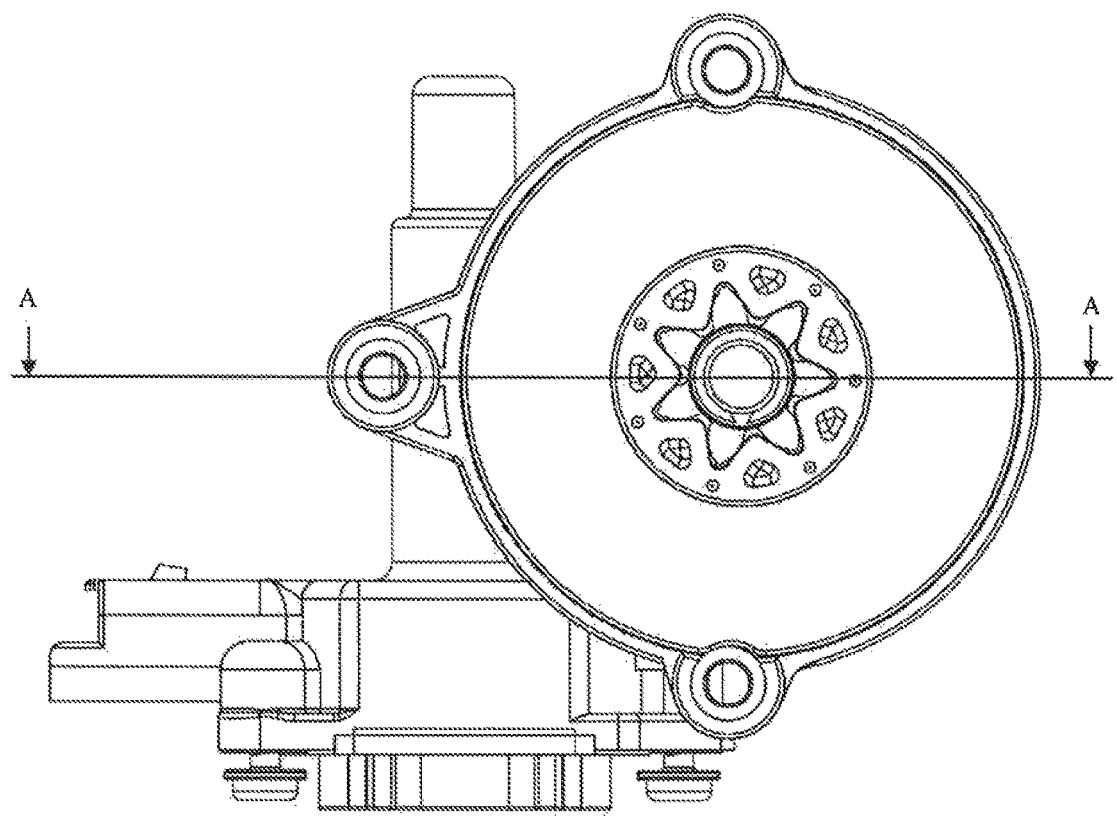
FIG. 3 is a front view of the gearbox.

As shown in the exploded view of FIG. 2, the housing 100 defines a chamber 105 therein. Preferably, the shaft 130 extends through the center of the chamber 105. One end of the shaft is fixedly mounted to a bottom of the chamber 105 and the other end extends towards and protrudes through the opening 101. A worm wheel 110 is rotatably mounted to the shaft 130 and is received in the chamber 105. A worm is provided on an output shaft of the motor 60 and is meshed with the worm wheel 110 so as to drive the worm wheel. The output gear 150 is connected to the worm wheel 110 and rotates with the worm wheel 110 about the stationary shaft 130, for driving an external device. In the present embodiment, a cylindrical boss 115 protrudes from a center of the worm wheel 110, and the output gear 150 is inserted into the boss 115. Alternatively, the output gear 150 may be integrally formed with the worm wheel 110. The worm may be a separate part fixed to the output shaft or it may be formed directly on the output shaft.

Figure 4:
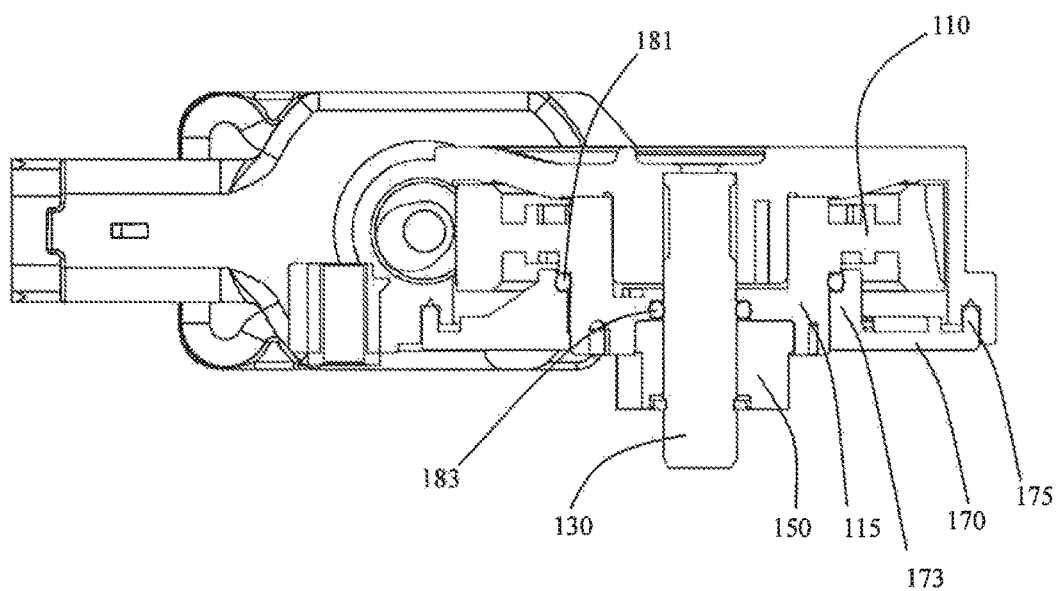
FIG. 4 is a sectional view of the gearbox taken along line A-A of FIG. 3.
Figure 5:
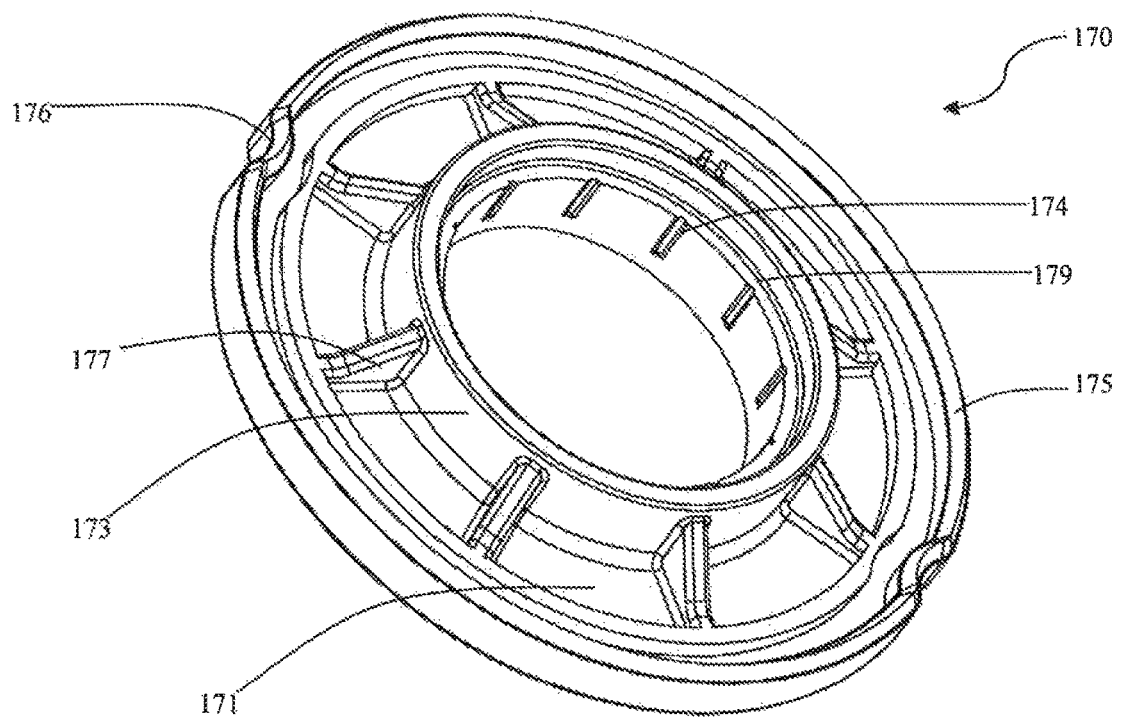
FIG. 5 illustrates a cover of the gearbox.

The cover 170, as shown more clearly in FIG. 5, is a monolithic structure formed from a plastic, including an annular cover plate 171, an inner flange 173 extending from an inner circumferential edge of the cover plate 171 into the chamber, and an outer flange 175 extending from an outer circumferential edge of the cover plate 171 into the housing. The inner flange 173 surrounds the boss 115 of the worm wheel 110 and supports the boss 115 circumferentially to prevent lateral deviation of the worm wheel 110 and the output gear 150 and to reduce flexural deflection of the stationary shaft 130. Preferably, the inner flange 173 is greater than the outer flange 175 in height to increase the contact area between the inner flange 173 and the boss 115. A distal end of the inner flange 173 is recessed to form a step 179. A first O-ring 181 (FIG. 4) is disposed between the step 179 and the worm wheel 110 and surrounds the stationary shaft 130. The first O-ring 181 provides a seal between an outer cylindrical surface of the boss 115 of the worm wheel and an inner bore of the cover 170.

A plurality of reinforcement ribs 177 extend radially outwardly from a radially outer surface of the inner flange 173. Each reinforcement rib 177 is a generally triangle plate in shape, which connects the outer surface of the inner flange 173 to the cover plate 171 for enhancing the strength of the cover 170. An axial height of the reinforcement rib 177 gradually decreases in a direction away from the inner flange 173. An inner surface of the inner flange 173 further defines a plurality of grooves 174 for receiving lubricant for lubricating the contact surfaces between the inner flange and the boss. Preferably, the grooves 174 extend in a direction parallel to the axis of the stationary shaft. Preferably, outer ends of the grooves 174 do not extend through an outer end portion of the inner flange 173 to prevent leakage of lubricant.

The outer flange 175 of the sealing cover 170 has more than one cutout 176 for positioning and securing the cover 170 to the housing 100. The housing 100 forms corresponding protrusions 178 extending toward a center of the cover plate 171 to engage with the cutouts 176.

In the present embodiment, the boss 115 includes a gear slot 113 for receiving the output gear 150. The shape of the gear slot 113 matches the shape of the output gear 150. A second O-ring 183 is disposed between the output gear 150 and the worm wheel 110 and surrounds the stationary shaft 130. The second O-ring 183 provides a seal between the stationary shaft 130 and the worm wheel 110.

In one embodiment, the output gear 150 is made from a metal material and the worm wheel 110 is made from a plastic material. In an alternative embodiment, the output gear 150 is formed on the worm wheel 110 by an insert molding process. In still another alternative embodiment, the worm wheel 110 and the output gear may be integrally formed with each other from the same material.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A gearbox comprising:
   a housing defining a chamber and an opening in communication with the chamber;
   a stationary shaft having one end mounted to a bottom of the chamber and the other end extending through the opening;
   a worm wheel rotatably mounted to the stationary shaft, and disposed in the chamber;
   an output gear coaxially connected to the worm wheel for rotation with the worm wheel, the output gear protruding out of the opening;
   a cover mounted to the opening;
   wherein the cover is formed from a single type of material and includes an annular cover plate having an inner bore, an inner flange extending from an edge of the inner bore towards the bottom of the chamber, and an outer flange extending from an outer circumferential edge of the cover plate into the housing for positioning the cover; and
   the worm wheel includes a cylindrical boss on a side adjacent the output gear, the cylindrical boss of the worm wheel extends into the inner bore of the annular cover plate and directly contacts the inner flange, and the worm wheel and the cylindrical boss are monolithically formed.

2. The gearbox of claim 1, wherein a height of the inner flange is greater than a height of the outer flange.

3. The gearbox of claim 1, wherein the outer flange defines at least one cutout, and the housing includes at least one corresponding protrusion engaging with the cutout for positioning of the cover.

4. The gearbox of claim 1, wherein the cover further includes a plurality of reinforcement ribs interconnecting a radially outer surface of the inner flange and the cover plate.

5. The gearbox of claim 4, wherein the reinforcement ribs are each plate-shaped, and a height of the reinforcement ribs gradually decrease in a direction away from the inner flange.

6. The gearbox of claim 1, wherein a first O-ring is disposed between a distal end of the inner flange and the worm wheel and radially surrounds the stationary shaft.

7. The gearbox of claim 6, wherein the output gear is inserted into the cylindrical boss, and a second O-ring is disposed between the output gear and the worm wheel and seals the worm wheel to the stationary shaft.

8. The gearbox of claim 1, wherein a radially inner surface of the inner flange is provided with a plurality of grooves for receiving lubricant.

9. The gearbox of claim 1, wherein the output gear is formed from metal, the worm wheel is formed with the output gear by an insert molding process, and the cover is formed from a plastic material.

10. The gearbox of claim 1, wherein the cover seals the opening in the housing.

11. A gear motor assembly comprising:
a motor including an output shaft and a worm provided on the output shaft; and
a gearbox, the gearbox comprising:
a housing defining a chamber and an opening in communication with the chamber;
a stationary shaft having one end mounted to a bottom of the chamber and the other end extending through the opening;
a worm wheel rotatably mounted to the stationary shaft, and disposed in the chamber;
an output gear coaxially connected to the worm wheel for rotation with the worm wheel, the output gear protruding out of the opening; and
a cover mounted to the opening,
wherein the cover is formed from a single type of material and includes an annular cover plate having an inner bore, an inner flange extending from an edge of the inner bore towards the bottom of the chamber, and an outer flange extending from an outer circumferential edge of the cover plate into the housing for positioning the cover; and
the worm wheel includes a cylindrical boss on a side adjacent the output gear, the boss of the worm wheel extending into the inner bore of the annular cover plate and directly contacts the inner flange, and the worm wheel and the cylindrical boss are monolithically formed; and
the worm extends into the chamber and is in mesh with the worm wheel.

12. The motor assembly of claim 11, wherein a height of the inner flange is greater than a height of the outer flange.

13. The motor assembly of claim 11, wherein the outer flange defines at least one cutout, and the housing includes at least one corresponding protrusion engaging with the cutout for positioning of the cover.

14. The motor assembly of claim 11, wherein the cover further includes a plurality of reinforcement ribs interconnecting a radially outer surface of the inner flange and the cover plate.

15. The motor assembly of claim 11, wherein a first O-ring is disposed between a distal end of the inner flange and the worm wheel and radially surrounds the stationary shaft.

16. The motor assembly of claim 15, wherein the output gear is inserted into the cylindrical boss, and a second O-ring is disposed between the output gear and the worm wheel and seals the worm wheel to the stationary shaft.

17. The motor assembly of claim 11, wherein a radially inner surface of the inner flange is provided with a plurality of grooves for receiving lubricant.

18. The motor assembly of claim 11, wherein the cover seals the opening in the housing.

* * * * *